US009077936B2

(12) United States Patent
Zhou et al.

(10) Patent No.: US 9,077,936 B2
(45) Date of Patent: Jul. 7, 2015

(54) INTEGRATED IF SAW FILTER IN BASEBAND DIGITAL DESIGN FOR ANALOG TV (OR HYBRID) TUNER

(75) Inventors: Chengzhi Zhou, Carlsbad, CA (US); Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 194 days.

(21) Appl. No.: 12/952,138

(22) Filed: Nov. 22, 2010

(65) Prior Publication Data

US 2011/0285912 A1 Nov. 24, 2011

Related U.S. Application Data

(60) Provisional application No. 61/263,271, filed on Nov. 20, 2009.

(51) Int. Cl.
*H04N 5/50* (2006.01)
*H04N 5/44* (2011.01)
*H04N 21/438* (2011.01)
*H04N 5/60* (2006.01)

(52) U.S. Cl.
CPC . *H04N 5/50* (2013.01); *H04N 5/44* (2013.01); *H04N 5/60* (2013.01); *H04N 21/4383* (2013.01)

(58) Field of Classification Search
USPC .......................................................... 348/660
See application file for complete search history.

(56) References Cited

U.S. PATENT DOCUMENTS

| 5,029,003 | A | * | 7/1991 | Jonnalagadda | 348/493 |
| 5,095,536 | A | * | 3/1992 | Loper | 455/324 |
| 6,222,891 | B1 | * | 4/2001 | Liu et al. | 375/326 |
| 7,239,357 | B2 | * | 7/2007 | Jaffe | 348/726 |
| 2004/0100588 | A1 | * | 5/2004 | Hartson et al. | 348/608 |
| 2008/0152152 | A1 | * | 6/2008 | Kimura | 381/17 |
| 2009/0244384 | A1 | * | 10/2009 | Takamori et al. | 348/572 |

OTHER PUBLICATIONS

International Preliminary Report on Patentability with Written Opinion for PCT Application No. PCT/US2010/057684, mailed May 31, 2012; 7 pages.
International Search Report and Written Opinion for Patent Application PCT/US2010/057684, mailed on Jan. 21, 2011, 8 pages.

* cited by examiner

*Primary Examiner* — Jefferey Harold
*Assistant Examiner* — Michael Teitelbaum
(74) *Attorney, Agent, or Firm* — Kilpatrick Townsend & Stockton LLP

(57) ABSTRACT

A filter for processing a digital TV composite signal having a video component and an audio component includes a digital video filter and a digital audio filter. The digital video filter includes a lowpass finite impulse response (FIR) filter, an up-mixer, an asymmetric filter for compensating a Nyquist slope of the video component, and a down-mixer connected in this order. The digital audio filter includes an audio down-mixer, a decimated FIR filter, an enhancing FIR filter, an interpolated FIR filter, and an audio up-mixer. These components are connected in series. Optionally, the decimating FIR filter is decimated by an integer decimation factor M, and the interpolated FIR filter is interpolated by an integer factor N. The integer M and N may have the same value.

14 Claims, 11 Drawing Sheets

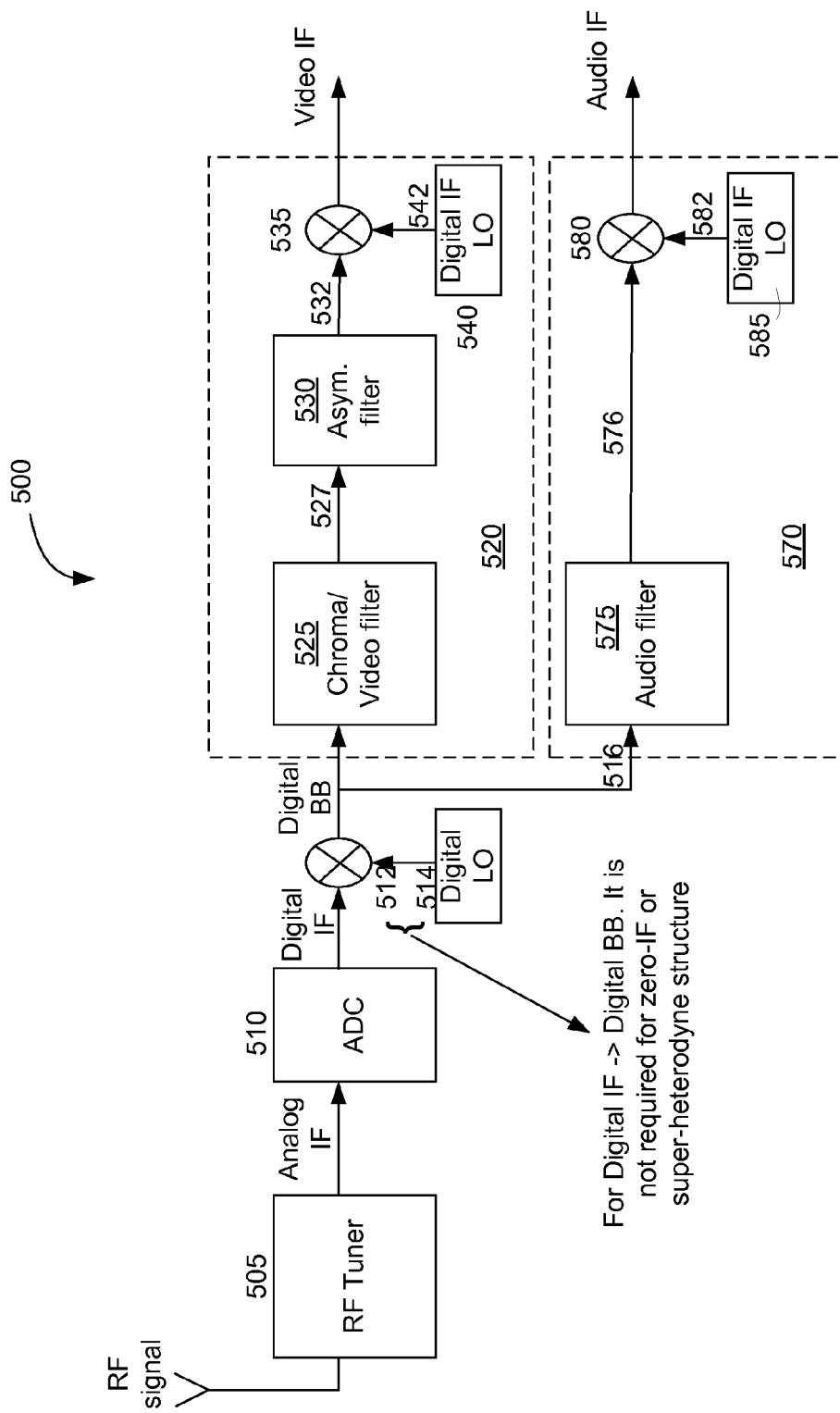

INTEGRATED IF SAW FILTER IN BASEBAND DIGITAL DESIGN FOR ANALOG TV (OR HYBRID) TUNER

CROSS-REFERENCES TO RELATED APPLICATIONS

The present application claims benefit under 35 USC 119 (e) of U.S. provisional application No. 61/263,271, filed Nov. 20, 2009, entitled "Integrated IF SAW Filter in Base-Band Digital Design For Analog TV (or Hybrid) Tuner," the content of which is incorporated herein by reference in its entirety.

BACKGROUND OF THE INVENTION

The present invention relates to a digital filter device and a method for processing TV composite signals, and more particularly to digital filters for processing an audio component and a video component of a TV composite signal.

The fundamental function of a video decoder is to separate the video component from the audio component. The separation of the video and audio components can be performed in multiple ways. Many separation methods have been implemented since the introduction of television.

A color television (TV) composite signal includes two basic components: the video component and the audio component. The video component further contains the luminance information, the chrominance information, and the synchronization information (Horizontal and Vertical Sync).

Television channels are grouped in multiple bands, such as low VHF band, high VHF band, and UHF band. These bands span from 40 MHz to 890 MHz. Within the frequency bands, adjacent channels are spaced at either 6 MHz or 8 MHz in most parts of the world.

For receiving a desired channel, a local oscillator of a TV receiver is tuned to a frequency so that after mixing, the desired or selected channel is produced at a preset intermediate frequency (IF) signal that is then further processed in a subsequent demodulator. IF demodulators typically employ surface acoustic wave (SAW) filters to condition the IF signal prior to extracting the video and the audio signals. The SAW filter rejects the energy bands associated with channels adjacent to the desired channel. The SAW filter provides a Nyquist slope bandpass response for the IF signal (see FIG. 1A). Since TV demodulators operate at either a 36 MHz or 44 MHz intermediate frequency, at least two SAW filters with center frequency at 36 MHz and at 44 MHz have to be used in order to support multi-standard TV signal reception.

Because a TV composite signal contains the luminance, chrominance and audio information, additional SAW filters for filtering the video component and audio component from the TV composite signal are required. Since different TV standards use different broadcast frequencies with different bandwidths, a traditional multi-standards TV receiver is required to have multiple different tuners equipped with video and audio filters for the decoders.

Further, even for one-standard (e.g. for one country) TV system, a demodulator requires to have at least two IF SAW filters, one for the video component and another one for the audio component in order to separate the video and audio components within the TV composite signal. The need of SAW filters not only requires a large area for layouts, but also increases the costs of the PCB bill of materials. For applications in handheld or wearable TV tuners, a small PCB layout area is considered especially critical. And the portability requirement imposes that TV tuners support multiple standards because, as consumers are now traveling to different countries around the world, they expect to receive local TV programs using their laptops, notebooks, smart phones, and other devices.

It can be seen that there is a need of a filter device and a method that can perform multi-standard channel filtering without resorting to the use of any mechanical IF SAW filters in order to reduce part count, cost, and size, and increase system reliability.

Accordingly, the present invention provides a technical solution to the problems discussed above, and that this solution can be economically integrated into a single electronic device using standard CMOS or any other integrated circuit processes.

BRIEF SUMMARY OF THE INVENTION

Embodiments of the present invention provide a filter device for processing a digital television composite signal that includes a video component and an audio component. Herein, the term "digital television composite signal" refers to a digitized version of an analog television composite signal that includes a digital video component and a digital audio component. The filter device includes an input terminal that is configured to receive the television composite signal and a first lowpass filter connected to the input terminal, the lowpass filter passes through the video component. The filter device further includes a video filter configured to receive the video component, the video filter contains a first mixer, a highpass filter, and a second mixer, which are connected in series, where the highpass filter is interposed between the first and second mixers. The filter device may additionally include a third mixer that frequency-shifts the audio component to DC (0 Hz) and a digital audio filter that passes through the audio component at DC. In an embodiment, the filter device may further include a video up-converter for up-converting the digitally filtered and processed video component onto a video intermediate frequency and an audio up-converter for converting the processed audio component to an audio intermediate frequency.

In an embodiment, the highpass filter of the video filter comprises an asymmetric filter for compensating for the Nyquist slope of the video component.

In another embodiment, the audio filter includes a decimating filter, a modifying filter, and an interpolating filter, that are connected serially in the given order. These three filters can be finite impulse response (FIR) filters and interposed between the third mixer and a fourth mixer. The third mixer downshifts the audio component of the television composite signal to DC by multiplying the audio component with a negative sound (or audio) carrier frequency, so that the audio component at DC can be filtered and decimated by the decimating filter. The decimated audio component is further processed in the modifying filter to further remove unwanted spectrum elements. And the interpolating filter interpolates and filters the modified audio components to provide an audio signal to an FM demodulator. In some circumstances, the audio signal may be up-converted to an audio intermediate frequency.

In an embodiment, a numerically control oscillator or a direct digital frequency synthesizer can provide the intermediate frequency for the video and audio up-converters. In other embodiments, direct digital frequency synthesizers may be used to produce positive and negative picture carrier frequencies and sound carrier frequencies. In some embodiments, filters of the video and audio filters comprise finite impulse response filters, each contains multiple digital taps; these taps are easily programmable for different analog TV standards.

The present invention also provides a method of processing a digital television baseband signal, the digital television baseband signal includes a video component and an audio component. The method includes receiving the digital television baseband signal and filtering the video component using a finite impulse response lowpass filter. The method further includes up-shifting the video component by a first frequency amount that corresponds to the picture carrier frequency. The up-shifted video component is then filtered with a Nyquist filter, which, in some embodiments, can be a highpass finite impulse response filter. The method includes down-shifting the Nyquist filtered video component by a second frequency amount to obtain a processed video signal, where the down-shifting cancels out the up-shifting; that is, the second frequency amount is substantially equal to the first frequency amount, but have a opposite sign so that their sum is substantially equal to zero. The method may further include up-converting the processed video signal to a video intermediate frequency.

In addition, the method includes down-shifting the audio component of the television baseband signal to DC to retrieve the audio component using a lowpass filter. The lowpass filter may be a FIR filter. The filtered audio component is then decimated and further processed with a subsequent filter. The processed audio component is then interpolated and filtered to produce a audio signal. In an embodiment, the method may include up-converting the audio signal to an audio intermediate frequency.

In an embodiment, down-shifting the audio component to DC includes multiplying or mixing the digital television baseband signal with a sound carrier frequency.

In an embodiment, it is an advantage of the present invention that all video and audio filters are FIR filters so that the entire receiving paths have a constant group delay.

It is an advantage of the present invention to provide a digital filter solution that is implementable in a single chip using any standard integrated circuit processes; the digital filter solution can also be easily programmed to adapt to different TV system standards using on-chip algorithms. In some embodiments, the algorithms of the digital filter can be updated or "patched" via a digital serial interface (e.g., I2C).

BRIEF DESCRIPTION OF THE DRAWINGS

The present invention is described with reference to the accompanying drawings, in which:

FIG. 5A is a block diagram of a TV receiver system according to an embodiment of the present invention;

DETAILED DESCRIPTION OF THE INVENTION

In this document, the terms "comprises", "comprising", "includes", "including" are intended to cover a non-exclusive inclusion. The term video, video signal, video component, or picture component means a signal comprising the luminance information and/or the chrominance (color) information including a picture carrier (or luminance carrier or visual carrier) and/or chrominance carrier/subcarrier. A picture carrier or a visual carrier may carry monochrome (black and white) information. A color or chrominance carrier/subcarrier may carry color or chrominance information. The terms picture and video are equivalent and they may be used alternatively. Likewise, an audio signal and a sound signal are equivalent, and they are modulated on a audio or sound carrier. A TV composite signal may include a video (picture) component and an audio (sound) component. A video component may include the monochrome information and the chrominance information.

Although embodiments of the invention described herein use the exemplary VSB signal (NTSC or National Television Standards Committee system), it will be appreciated that the embodiments may apply to other signals such as PAL (Phase Alternate Line) and multiple versions of SECAM (Sequentiel Couleur avec Memoire) or any other varieties thereof.

Figure 1A:
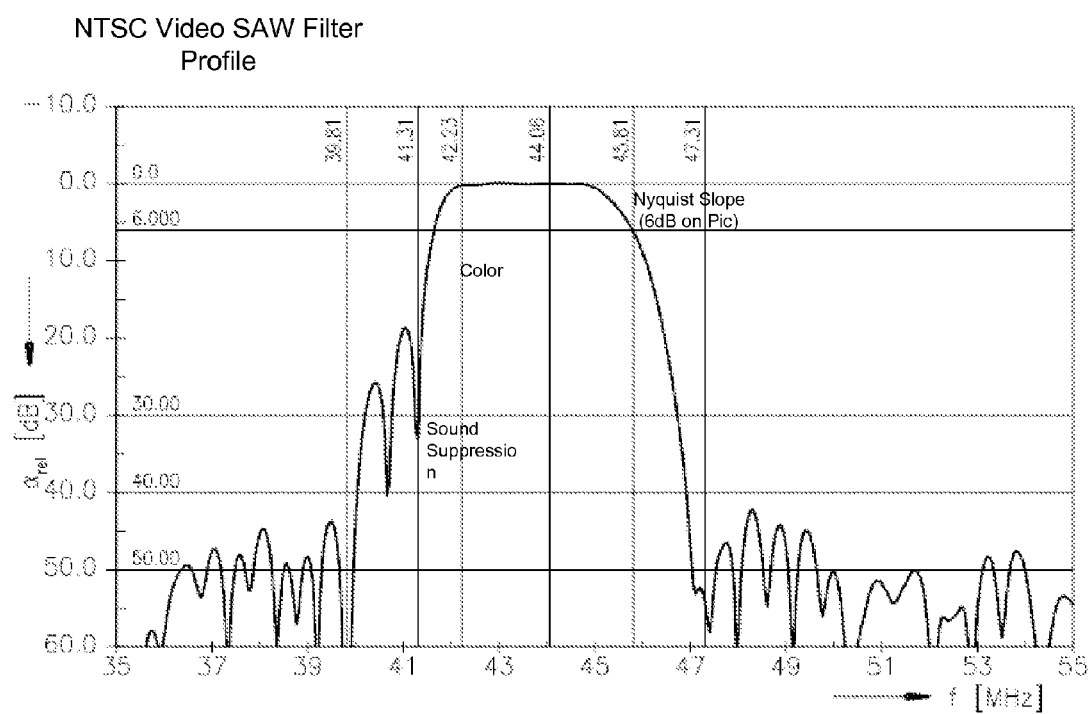
FIG. 1A is a frequency response of a conventional video SAW filter having an IF centered around 44 MHz for the NTSC system.

FIG. 1A is a frequency response of a conventional video SAW filter having an IF centered around 44 MHz according to the NTSC analog TV specification. This video filter profile is taken from the SAW filter M3953M data sheet of EPCOS, Inc.

Figure 1B:
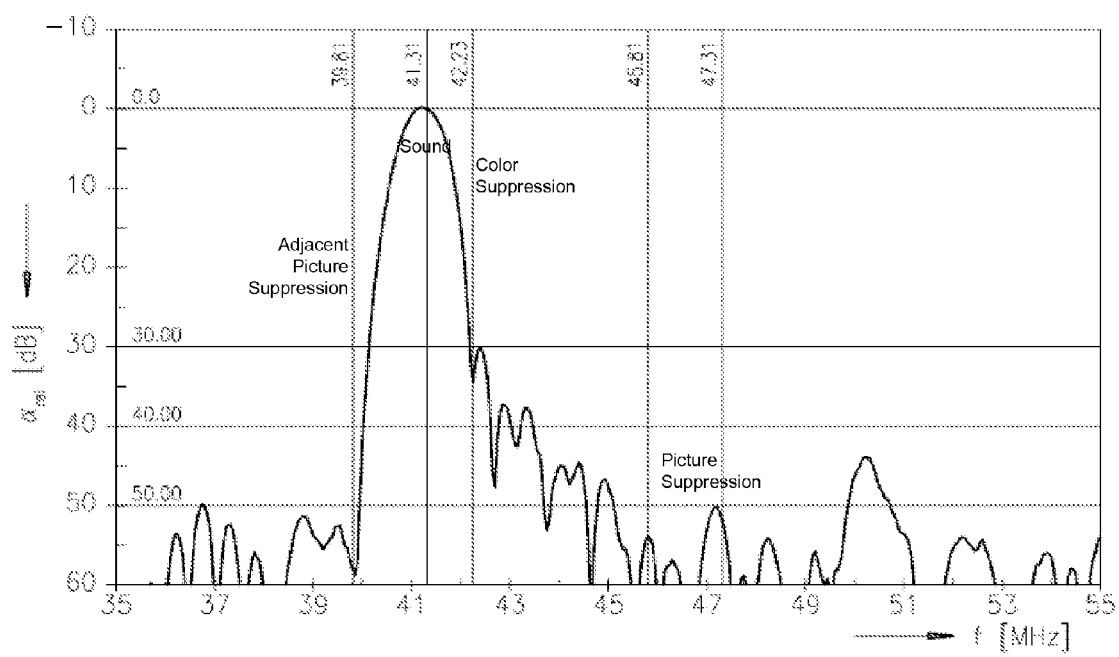
FIG. 1B is a frequency response of a conventional NTSC audio SAW filter.

FIG. 1B is a frequency response of a conventional NTSC audio SAW filter. This audio filter profile is a typical frequency response of the SAW filter M9370M. Both video and audio filters M3953M and M9370M are manufactured by EPCOS, Inc. (www.epcos.com).

Figure 2:
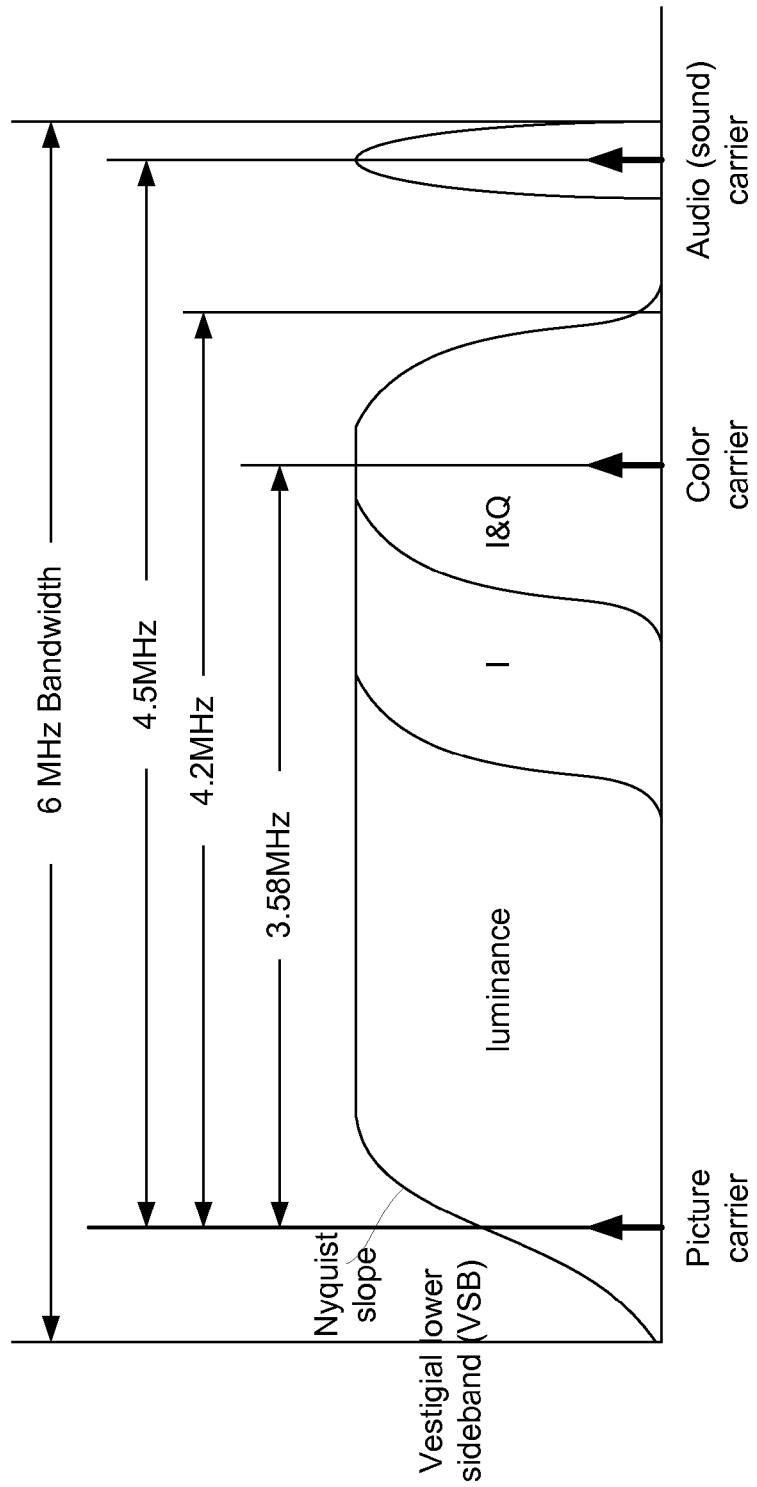
FIG. 2 is a TV composite signal including a picture carrier, a color carrier, and an audio carrier according to the NTSC specification.

FIG. 2 is a TV composite signal according to the NTSC specification. The NTSC channel includes a picture component modulated on a picture carrier frequency, a color component modulated on a color carrier frequency, and sound component modulated on an audio carrier frequency. The TV composite signal represents the baseband TV signal and has a bandwidth of 6 MHz (note that the bandwidth of the SECAM and PAL systems is 8 MHz). The chrominance signals I and Q (U and V in SECAM and PAL) are located at the high frequency end of the luminance signal. And the audio signal is at a higher frequency. Referenced to the picture carrier frequency, the color carrier frequency is at 3.58 MHz (4.43 MHz for the PAL system), and the sound carrier frequency is at 4.5 MHz (5.5 MHz, 6 MHz, or 6.5 MHz for the PAL system) from the picture carrier frequency for the NTSC system. As shown in FIG. 2, the Nyquist slope frequency response crosses the picture carrier frequency at 0.5 of the energy of the TV composite signal or the TV channel.

Figure 3:
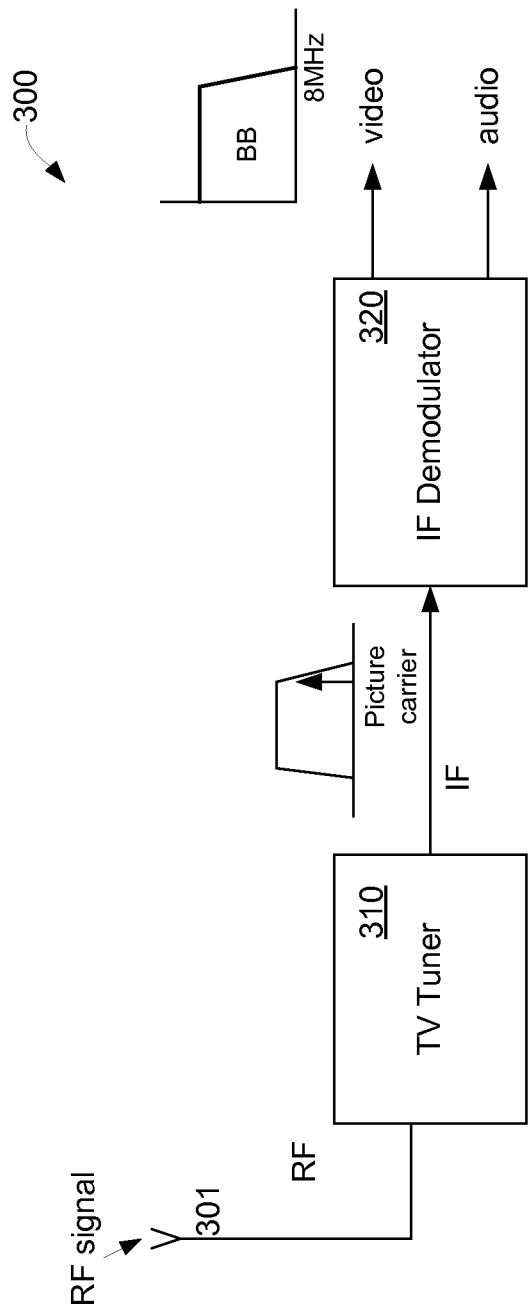
FIG. 3 is a block diagram of a conventional TV tuner system including an IF demodulator.

FIG. 3 is a block diagram of a conventional TV tuner system 300 that includes a TV tuner 310 coupled to a TV antenna 301 for receiving a radio frequency (RF) signal. The TV tuner includes a local oscillator for down-mixing the RF signal to an intermediate frequency (IF) signal, which contains a desired TV channel. The IF signal is then provided to an IF demodulator 320 that includes individual video and audio SAW filters as describes above to separate the video signal and the audio signal. The video and audio signals are then individually demodulated and amplified. Thus, the conventional TV tuner requires several SAW filters and analog amplifiers that take up printed circuit board space, consume relatively high power, and have poor separation of the video and audio signals.

Figure 4:
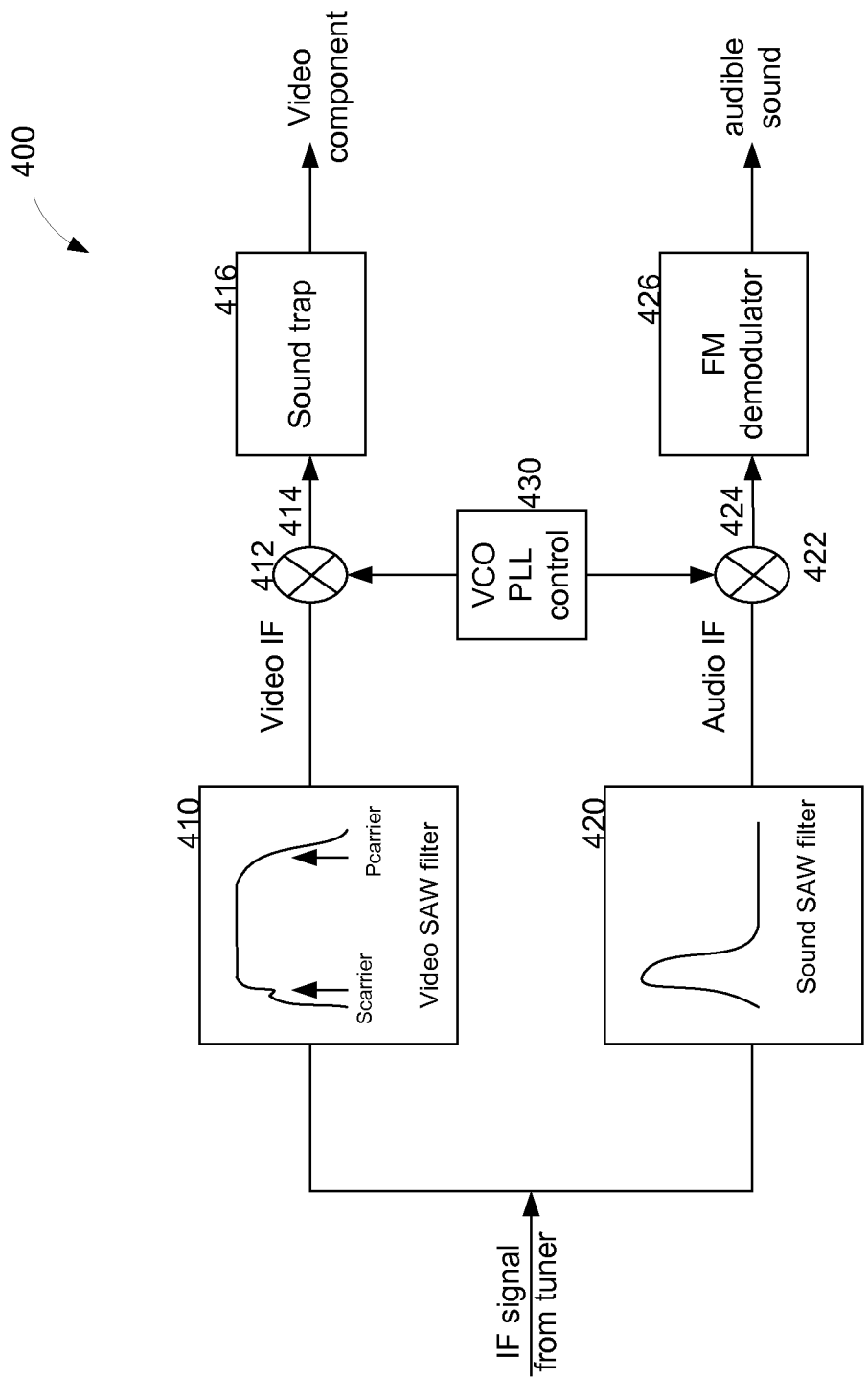
FIG. 4 is a conventional block diagram showing the use of a video SAW filter and an audio SAW filter.

FIG. 4 is a conventional block diagram of a demodulator 400 illustrating the use of a video SAW filter and an audio SAW filter. An IF signal from the TV tuner contains a video signal and an audio signal. A video SAW filter 410 passes through the video signal and a sound SAW filter 420 passes through the audio signal. The filtered video and audio signals are then down-converted with respective mixers 412 and 422 that are coupled to a voltage controlled oscillator 430. The frequency down-converted video signal is routed through a sound trap 416 that suppresses any audio frequency components that may reside in the video signal. And the frequency down-converted audio signal is provided to a FM demodulator 424 that produces an audible sound. Therefore, the conventional TV demodulator requires at least three filters: the video and audio SAW filters and the sound trap bandpass filter.

FIG. 5A is a block diagram of a TV tuner system 500 according to an embodiment of the present invention. TV receiver system 500 includes an RF tuner 505 that receives an RF signal and frequency down-converts it to an analog IF signal. In an embodiment, the analog IF signal may be either a zero IF, low-IF, or a conventional IF based on the legacy standard (e.g., 36 MHz or 44 MHz). In an embodiment, TV tuner system 500 includes an analog-to-digital converter ADC 510 that converts the analog IF signal to a digital IF signal 512. Note that down-mixer 512 and digital local oscillator (LO) 514 are only required to convert the digital IF to a digital baseband in the case where RF tuner 505 does not have a zero-IF or super-heterodyne architecture. Down-mixer 512 mixes the digital IF signal with the output of the digital local oscillator 514 to down-convert the digital IF signal to a baseband signal 516. In an embodiment, the digital local oscillator is implemented as a direct digital frequency synthesizer. The digital local oscillator frequency is selected so that the channel center frequency is down-converted to DC (0 Hz). TV tuner system 500 further includes a video filter 520 and a sound filter 570.

Video filter 520 replaces the conventional SAW filter in that it passes through the video component and performs the Nyquist slope shaping. Video filter 520 includes a chroma/video filter 525 coupled to an asymmetric filter 530. Filter 525 may be implemented using a finite impulse response (FIR) filter structure that is configured as a low pass filter for passing through the video component and suppressing the audio component. Asymmetric filter 530 can be implemented as a highpass FIR filter with complex frequency shift for further compensating the Nyquist slope of the video component. In some embodiments, asymmetric filter 530 is further coupled to a digital up-converter 535 that transforms the processed video signal to an intermediate frequency for further video demodulation. The up-conversion may be realized by mixing the output 532 of asymmetric filter 530 with a digital IF signal 542 from a digital local oscillator 540. Note that the intermediate frequency 542 can be 36 MHz or 44 MHz or other frequencies depending from a subsequent video decoder (not shown).

Figure 5B:
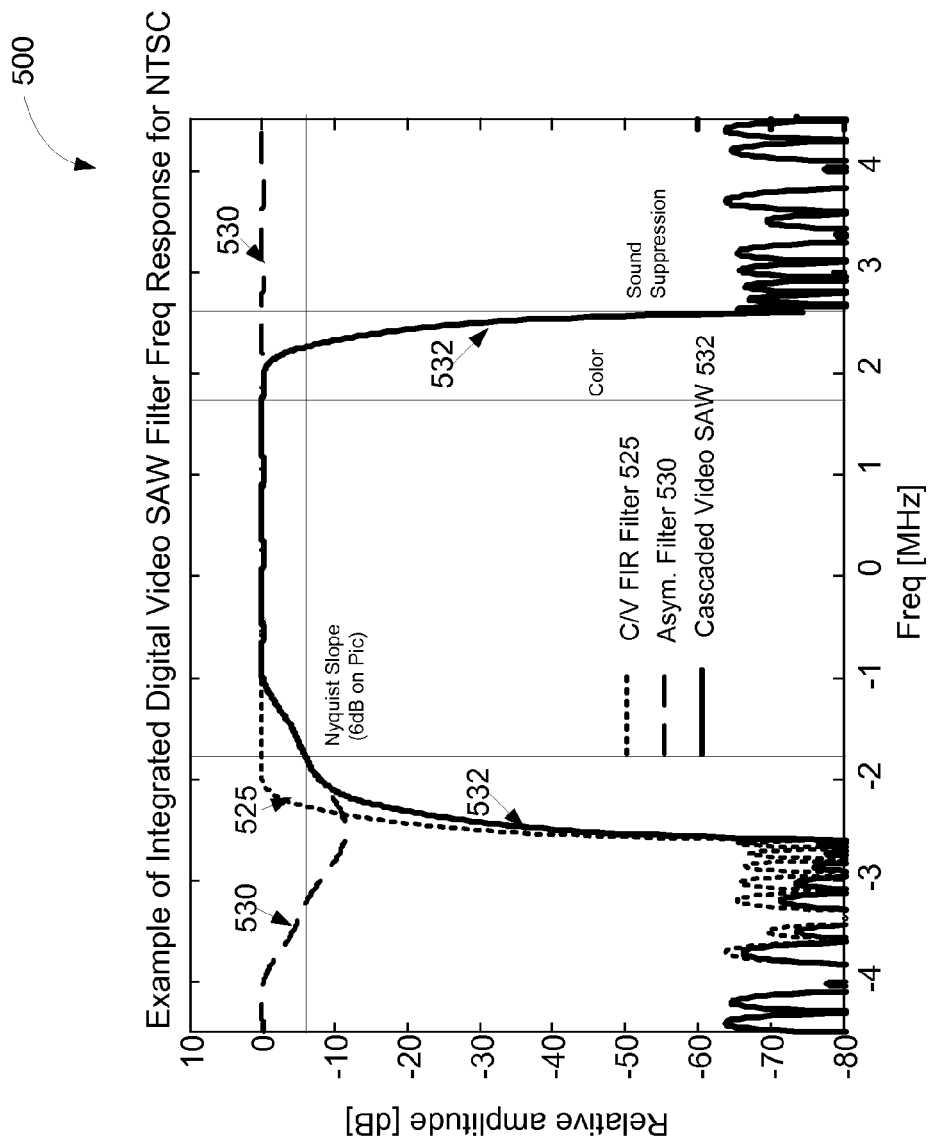
FIG. 5B is an exemplary graph illustrating a frequency response of a video/chroma filter, an asymmetric filter, and the resulting frequency response according to an embodiment of the present invention.

FIG. 5B is an exemplary graph 500 illustrating a frequency response of a video/chroma filter 525, an asymmetric filter 530, and the resulting frequency response 532 according to an embodiment of the present invention;

Referring back to FIG. 5A, sound filter 570 includes an audio filter 575 configured to receive digital baseband signal 516. As described above, the channel center frequency of digital baseband signal 516 is down-converted to DC, i.e., the audio carrier frequency is offset from the channel center by 2.75 MHz for the NTSC system. That means, the digital baseband signal will be mixed with a sound carrier frequency −2.75 MHz so that the audio component is at DC. Note that sound carrier frequency can have other frequency values depending on the standard used. For example, the sound carrier frequency could be offset by 3.25 MHz, or 3.75 MHz, or other frequency amount from the channel center frequency. In that case, sound carrier frequency will be adjusted accordingly so that the audio component is down-converted to DC. The audio component at DC is then processed and output as an audio signal 576. In an embodiment, the processed digital audio signal 576 can directly be provided to a host processor or audio processor for further processing. In another embodiment, the audio signal 576 may be up-converted to an audio intermediate frequency to provide to an FM demodulator for further processing. In an embodiment, the up-conversion can be implemented with a digital up-converter 580 that digitally multiplies the audio signal 576 with an IF frequency 582 from a digital IF local oscillator 585. In an embodiment, the digital IF local oscillator 585 may be a direct digital frequency synthesizer.

In an embodiment, video filter 520 and audio filter 570 can be implemented as a hardwired digital circuit such as an application specific integrated circuit (ASIC), a programmable field programmable gate array (FPGA), or a generic or custom digital signal processor running program codes. In an embodiment, IF signals 542 and 582 have the same frequency and share the same direct digital frequency synthesizer.

Figure 6A:
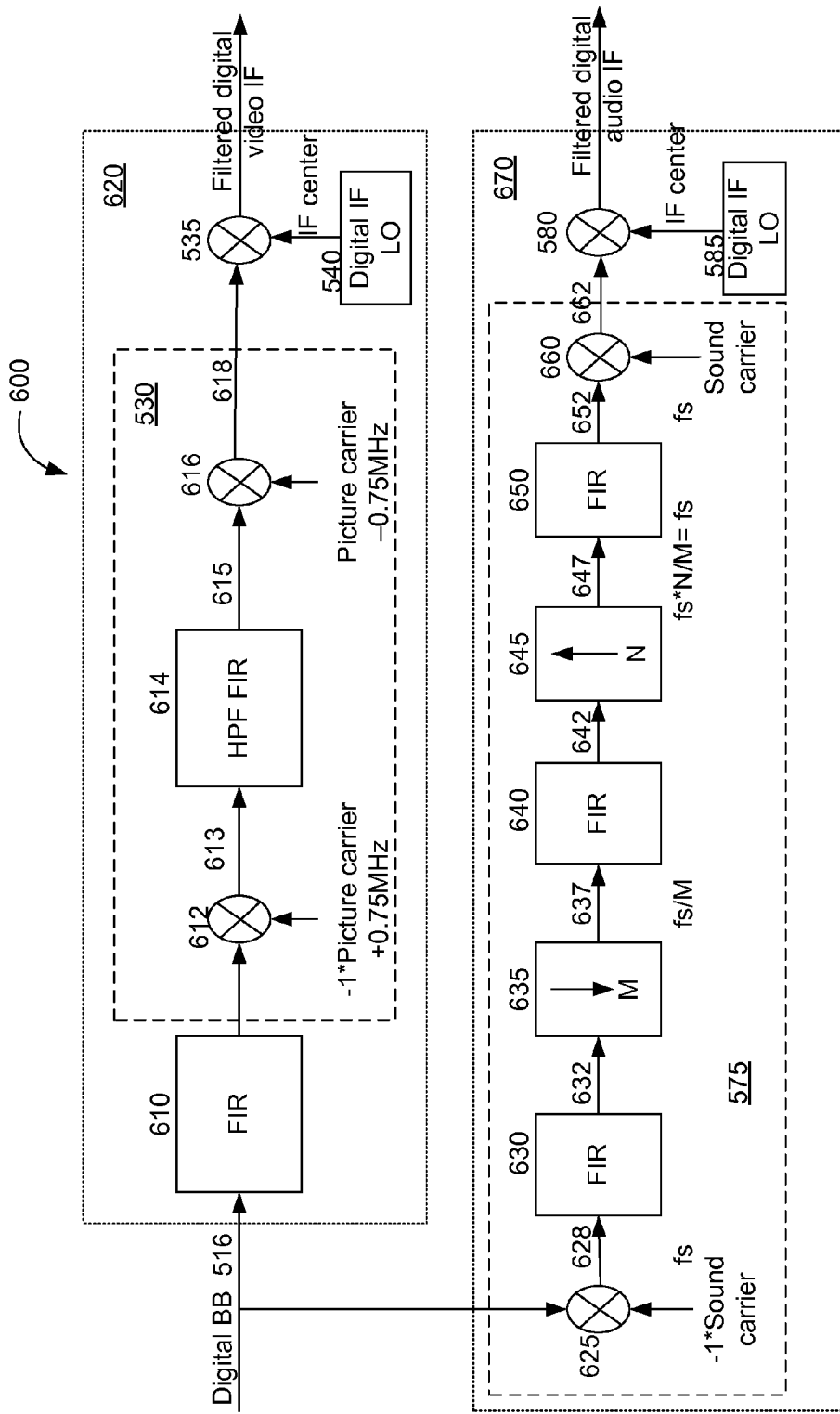
FIG. 6A is a simplified block circuit diagram of a TV receiver system according to an embodiment of the present invention.

FIG. 6A is a simplified block circuit diagram of a baseband filtering device 600 including a video filter 620 and an audio filter 670 according to an embodiment of the present invention. In an embodiment, video filter 620 includes an FIR filter 610 that is implemented as a lowpass filter for extracting the luminance signal from a digital baseband signal 516. A down-mixer 612 has an input terminal coupled to an output of FIR filter 610 and another input terminal coupled to a picture carrier frequency times −1, and plus 0.75 MHz. In the NTSC system, the picture carrier frequency is −1.75 MHz from the channel center, so the down-converted frequency is −1.75 MHz*(−1)+0.75 MHz=2.5 MHz; it is appreciated that the picture carrier frequency can be any other value, such as −2.25 MHz, or −2.75 MHz used in the PAL system. This picture carrier frequency leads the center of baseband signal shift to the vestigial lower sideband of video component (FIG. 2). Down-mixer 612 produces a video baseband signal 613 that can further be modified by a highpass filter 614. In an embodiment, highpass filter 614 is a digital FIR filter having a frequency response for compensation of a Nyquist slope of video signal 613. The output 615 of highpass filter 614 is shifted back to the normal baseband position by down-mixer 616 with a negative picture carrier frequency minus 0.75 MHz (e.g., −2.5 MHz in NTSC system). In some circumstances, the obtained video signal 618 is up-converted to an IF frequency by an up-converter 535. In an embodiment, the picture carrier frequency and video IF frequency can be implemented as programmable variables to adjust for different analog TV standards. Although the baseband filtering device is illustrated using discrete functional blocks, the baseband filtering device can be implemented using a general-purpose or application-specific digital signal processor as described in more detail in late sections (e.g., see FIG. 7).

Audio filter 670 includes an audio down-mixer 625 that receives digital baseband signal 516 and mixes it with a negative sound carrier frequency to produce a digital audio baseband signal 628 at DC. Audio baseband signal 628 is lowpass filtered by a FIR filter 630 and decimated in a decimator 635 by a factor M to produce a decimated audio signal 637. Decimated signal 637 is further modified (enhanced) by a subsequent FIR filter 640 with the sample rate of fs/M. FIR filter 640 may be a lowpass filter that further removes unwanted spectrum signals from the decimated audio signal. The modified (or enhanced) audio signal 642 is then interpolated by an interpolator 645 that increases the sampling rate by a factor N and produces an interpolated audio signal 647. Interpolated signal 647 is further lowpass filtered by an FIR filter 650 that reduces the levels of aliasing signals caused by the interpolation. Filtered audio signal 652 is shifted back to the previous audio location by an up-mixer 660 with the sound carrier frequency. In some circumstances, it is desirable that the audio signal 662 is in an IF band (e.g., 36 or 44 MHz), then the audio signal 662 is up-converted to the IF band by an up-converter 580 that receives the IF frequency from the digital IF local oscillator 585.

In an embodiment, the decimating factor M and the interpolating factor N are positive integer. In another embodiment, decimating factor M and interpolating factor have the same value. In an embodiment, the sound carrier frequency, the picture carrier frequency, and the IF local oscillator frequency can be implemented as programmable parameters that are adjusted for different analog TV standards. In an embodiment, picture carrier frequency, sound carrier frequency, and IF frequency are digital signals that are generated using numerically controlled oscillators. They can be implemented using common direct digital frequency synthesizers (DDFS), or simple look-up tables with fixed point entries of several sinusoidal waves at desired frequencies.

In an embodiment, mixer pairs 612/616, and 625/660 may use the same local oscillator for each pair, where the local oscillator can be a digital direct frequency synthesizer. And the IF mixers 535 and 580 for the respective filtered video and audio components may also share one digital direct frequency synthesizer.

As the filter device disclosed in the present invention is purely digital, it can be designed using any hardware description language such as Verilog or VHDL. They also can be simulated using any computer aided design tools such as Matlab or C model simulation. And the simulation model can also be synthesized using any logic synthesis tools and implemented as an integrated circuit device using any semiconductor process. Those skilled in the art will readily observe that numerous modifications and alterations of the filter device may be made based on the teachings of the present invention.

Figure 6B:
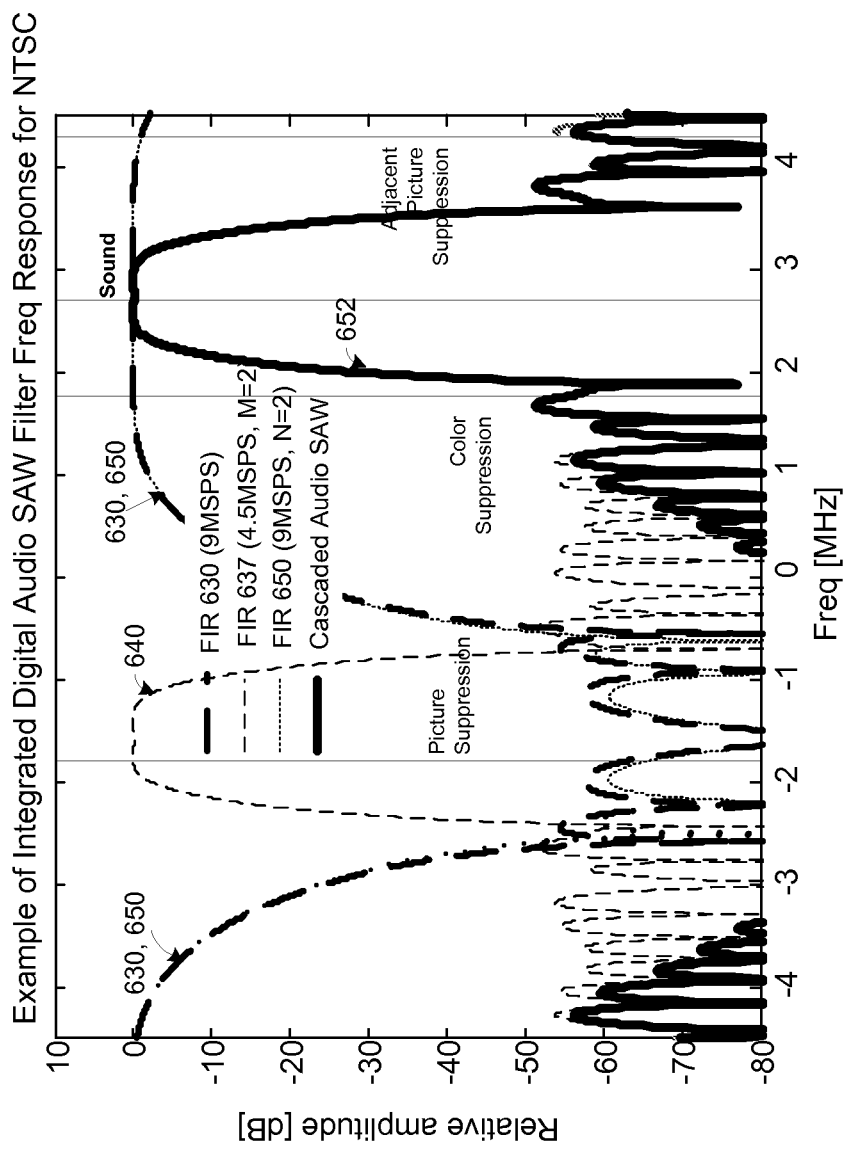
FIG. 6B is an exemplary graph illustrating frequency response waveforms at different stages of a digital audio SAW filter according to an embodiment of the present invention.

FIG. 6B is an exemplary graph illustrating frequency response waveforms at different stages of a digital audio SAW filter according to an embodiment of the present invention. The graph will be described together with the functional blocks in FIG. 6A. Curves 630 and 650 show an exemplary frequency response of the respective filters 630 and 650. As described above, FIR filter 630 can be a lowpass filter that passes the audio signal 628. Curve 640 is an exemplary frequency response of FIR filter 640 that further suppresses picture components that may be present in the audio signal. In an embodiment, FIR filters 630 and 650 may be identical. Curve 652 is the resulting frequency response of filters 630, 640, and 650 that are connected in series.

In an embodiment, a decimator 635 may be interposed between FIR filters 630 and 640, and an interpolator 345 is interposed between FIR filters 640 and 650 (FIG. 6A). The resulting frequency response (FIG. 6B) does not change as illustrated in curve 652 shown in FIG. 6B.

Figure 7:
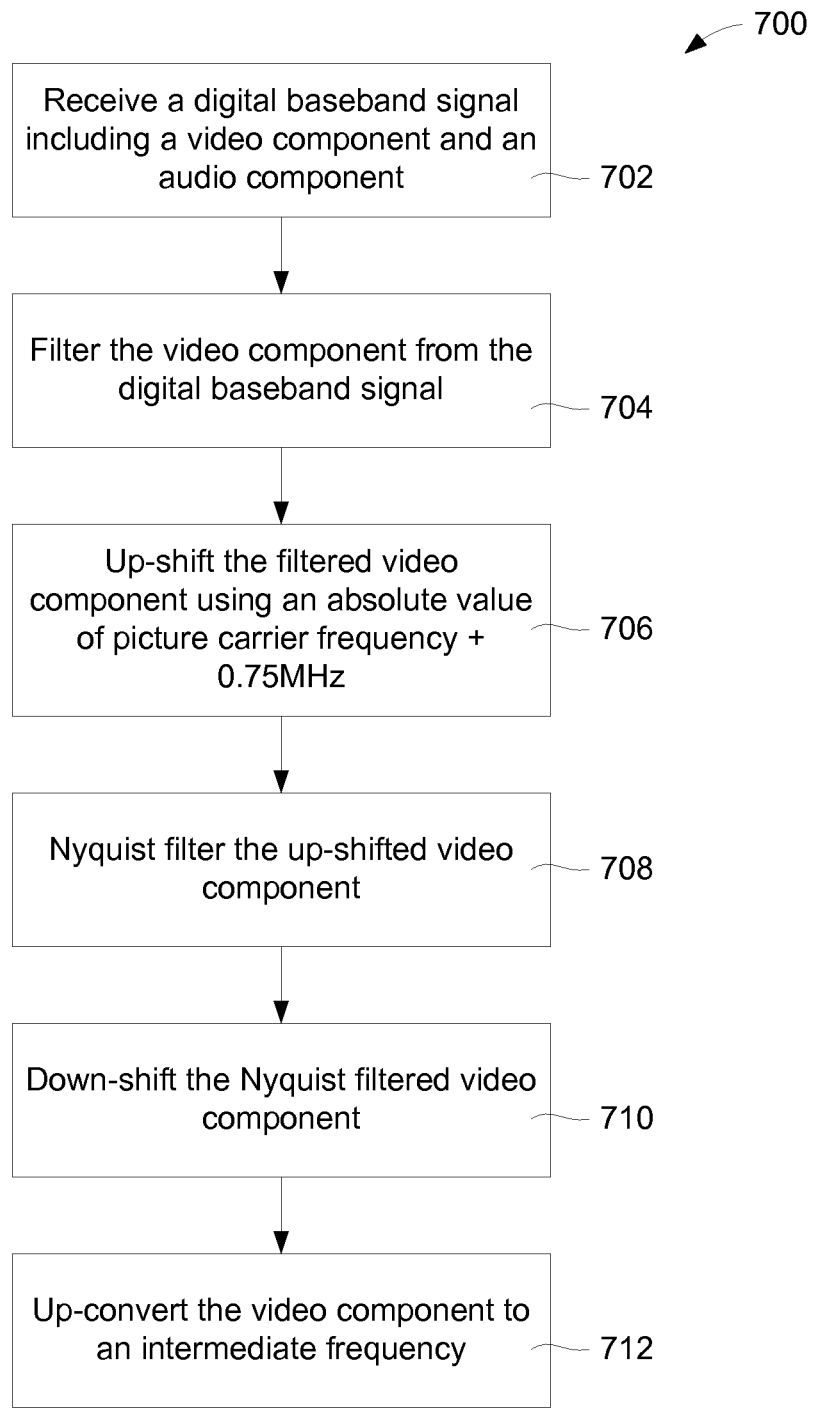
FIG. 7 is a flowchart diagram illustrating a method of processing a video component according to an embodiment of the present invention.

FIG. 7 is a flowchart diagram 700 illustrating the steps of a method 700 for processing a video component in a digital baseband according to an embodiment of the present invention. Referring to FIG. 6, the baseband filter device 600 receives the digital baseband signal having a channel center at DC. In step 702, the baseband filter device receives the digital baseband signal having a channel center at DC. The digital baseband signal includes a video component and an audio component. In step 704, the video component in the digital baseband signal is filtered using a lowpass filter. The low pass filter may be implemented using a finite impulse response (FIR) filter. In step 706, the filtered video component is frequency up-shifted by multiplying the filtered video component with a frequency corresponding to the absolute value of picture carrier frequency plus 0.75 MHz. In step 708, the frequency up-shifted video component is Nyquist filtered to compensate for the Nyquist slope. In an embodiment, the Nyquist slope compensation is performed using a FIR filter having a highpass characteristic. In step 710, the Nyquist compensated video component is frequency down-shifted by a frequency amount significantly equal to the absolute value of picture carrier frequency plus 0.75 MHz. In step 712, the Nyquist compensated video component is up-converted to an intermediate frequency to provide a video decoder for further processing.

Figure 8:
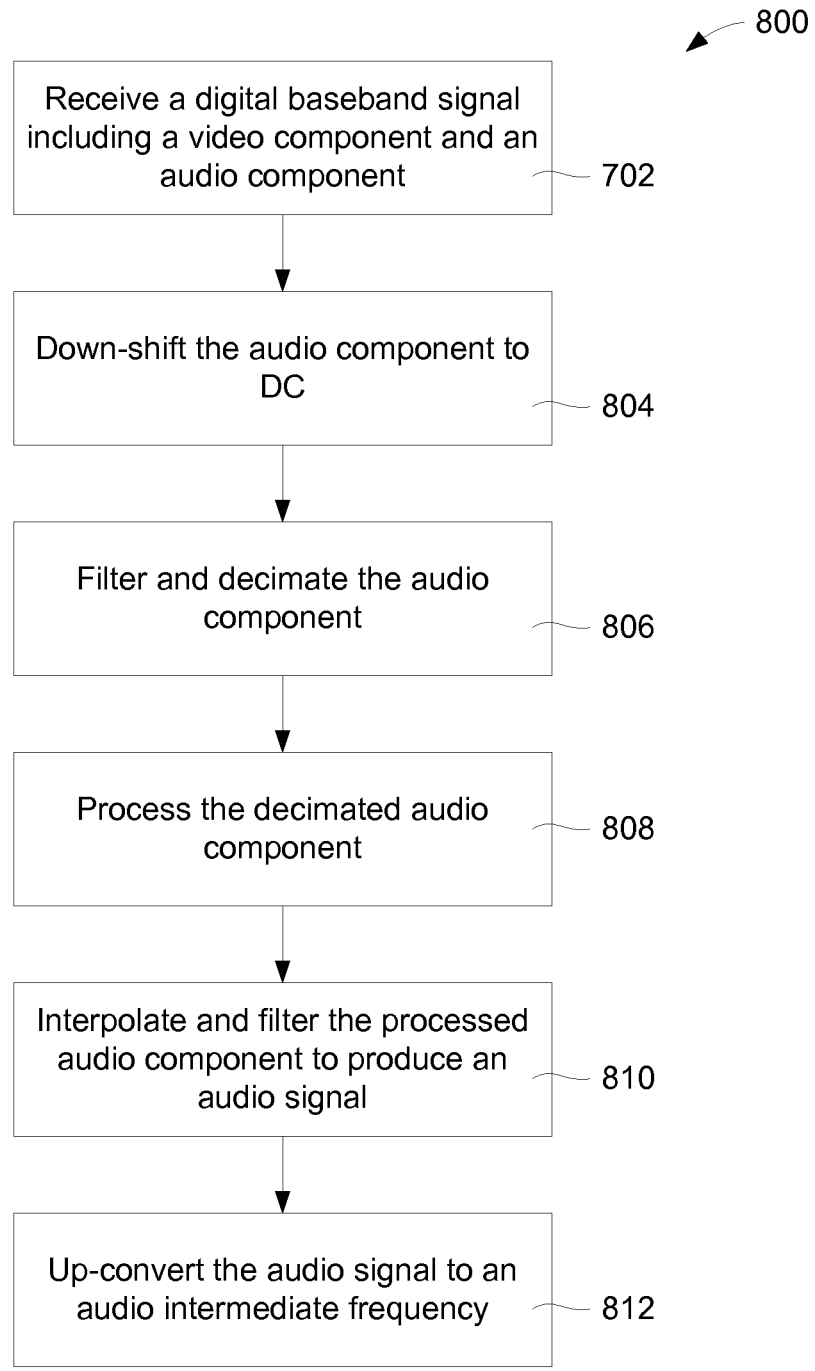
FIG. 8 is a flowchart diagram illustrating a method of processing an audio component according to an embodiment of the present invention.

FIG. 8 is a flowchart diagram of a method 800 for processing an audio component according to an embodiment of the present invention. As described above, when the channel center is down-shifted to DC, the audio carrier is offset from DC by a frequency offset, e.g., 2.75 MHz in the NTSC system. In step 702 (as shown in FIG. 7), the baseband filter device receives the digital baseband signal having the video component and the audio component. The video component is filtered using a lowpass FIR filter (step 704 in FIG. 7). Here, method 800 frequency down-shifts the digital baseband signal to DC by mixing the digital baseband signal with a sound carrier frequency to obtain the audio component at DC (step 804). In step 806, the audio component at DC is filtered and decimated to remove unwanted signals such as the video component. In step 808, the decimated audio component is further processed using a digital filter. In an embodiment, a finite impulse response (FIR) lowpass filter may be used to further suppress the video component and other unwanted signals. In step 810, the processed audio component is interpolated and filtered to produce a digital audio output. In step 812, the digital audio output may be up-converted to an intermediate frequency for further processing at an FM demodulator.

The methods described above may be implemented, for example, by using a general-purpose or custom digital signal processor to execute a sequence of machine-readable instructions. These instructions may reside in various types of signal-bearing media. In an embodiment, the signal-bearing medium may comprise RAM (SRAM, DRAM), ROM, EPROM, EEPROM, or Flash memory. In an embodiment, the machine readable instructions may comprise lines of C, or C++, or other suitable programming or coding languages commonly used by those skilled in the art.

While the embodiments and advantages of the present invention have been described for a TV signal based on the NTSC standard, it will be appreciated by those skilled in the art that the disclosure may equally be applied to TV signals of different standards such as PAL and SECAM. Thus, the disclosure and description herein are purely illustrative and are not intended to be in any sense limiting.

What is claimed is:

1. A filter for processing a digital television (TV) composite signal having a video component and an audio component, the filter comprising:
   an input terminal for receiving the digital TV composite signal;
   a first lowpass filter coupled to the input terminal, the first lowpass filter being configured to pass through the video component;
   a digital video filter coupled to the lowpass filter and being configured to process the video component, the digital video filter comprising:
      a first mixer configured to frequency shift the video component by a first frequency offset;
      a digital highpass filter responsive to the first mixer and configured to compensate a Nyquist slope of the first frequency-shifted video component; and
      a second mixer responsive to the digital highpass filter; said first mixer, said digital highpass filter and said second mixer being coupled in series;
   a third mixer configured to frequency shift the digital TV composite signal by a first frequency amount; and
   a digital audio filter configured to receive the frequency shifted digital TV composite signal.

2. The filter of claim 1, wherein the first lowpass filter comprises a first finite impulse response (FIR) filter.

3. The filter of claim 1, wherein:
   the second mixer mixes the Nyquist compensated video component by a second frequency offset to obtain a second frequency-shifted and Nyquist compensated video component.

4. The filter of claim 3, wherein the sum of the first frequency offset and the second frequency offset is substantially equal to zero.

5. The filter of claim 3, wherein the first and second frequency offsets are associated with a picture carrier frequency and a third frequency offset.

6. The filter of claim 5, wherein the third frequency offset is about 0.75 MHz.

7. The filter of claim 1, wherein the digital audio filter comprises:
   a second lowpass filter configured to pass through the audio component;
   a decimator configured to reduce a first sampling rate of the audio component by a factor M;
   a second FIR filter configured to enhance the reduced sampling rate audio component;
   an interpolator configure to increase the enhanced and sampling-rate audio reduced audio component by a factor N; and
   a third FIR filter configured to output an audio signal.

8. The filter of claim 7, wherein the factors M and N are positive integer.

9. The filter of claim 7, wherein the factors M and N are equal.

10. The filter of claim 7, wherein the digital audio filter further comprises a fourth mixer configured to frequency shift the audio signal by a second frequency amount.

11. The filter of claim 10, wherein the second frequency amount is associated with a sound carrier frequency.

12. The filter of claim 7, wherein the digital audio filter further comprises a first up-converter configured to up-convert the audio signal to an audio intermediate frequency.

13. The filter of claim 1, wherein the first frequency amount is associated with a sound carrier frequency.

14. The filter of claim 1 further comprising a second up-converter configured to up-convert the processed video component to a video intermediate frequency.

* * * * *